(12) United States Patent
Jain et al.

(10) Patent No.: US 8,124,037 B2
(45) Date of Patent: Feb. 28, 2012

(54) PEROVSKITE MATERIALS FOR SOLID OXIDE FUEL CELL CATHODES

(75) Inventors: Kailash C. Jain, Troy, MI (US); Joseph M. Keller, Grand Blanc, MI (US); Rick D. Kerr, Fenton, MI (US)

(73) Assignee: Delphi Technologies, Inc., Troy, MI (US)

( * ) Notice: Subject to any disclaimer, the term of this patent is extended or adjusted under 35 U.S.C. 154(b) by 199 days.

(21) Appl. No.: 12/635,756

(22) Filed: Dec. 11, 2009

(65) Prior Publication Data

US 2011/0143255 A1 Jun. 16, 2011

(51) Int. Cl.
*C04B 35/00* (2006.01)

(52) U.S. Cl. ........................ 423/263; 423/21.1

(58) Field of Classification Search .............. 423/21.1, 423/263
See application file for complete search history.

(56) References Cited

U.S. PATENT DOCUMENTS 5,575,940 A * 11/1996 Lofftus .................. 252/62.63
5,817,597 A * 10/1998 Carolan et al. .............. 502/400

FOREIGN PATENT DOCUMENTS

JP      61-215247   *   9/1986

OTHER PUBLICATIONS

Petric, Anthony, et al, "Evaluation of La-Sr-Co-Fe-O perovskites for solid oxide fuel cells and gas separation membranes," Solid State Ionics, 135 (2000) 719-725.
Adler, S.B., et al, "Electrode Kinetics of Porous Mixed-Conducting Oxygen Electrodes," J. Electrochem. Soc., 143 (11), 3554, 1996.
Lei, Z., et al, "Low temperature processing of interlayer-free La0.6Sr0.4Co0.2Fe0.8O3-δ cathodes for intermediate temperature solid oxide fuel cells," J. Power Sources, 161 (2006) 1169-1175.
Murray, E.P., et al, "Electrochemical performance of (La,Sr)(Co,Fe)O3-(Ce,Gd)O3 composite cathodes," Solid State Ionics, 148 (2002) 27-34.

Tai, L.-W., et al, "Structure and electrical properties of La1-xSrxCo1-yFeyO3. Part 2. The system La1-xSrxCo0.Fe0.8O3," Solid State Ionics 76 (1995) 273-283.
Lankhorst, M.H.R., et al, "Thermodynamic Quantities and Defect Structure of La0.6Sr0.4Co1-yFeyO3-δ ( y=0-0.6) from High-Temperature Coulometric Titration Experiments," J. Solid State Chemistry, 130, 302-310 (1997).
Mineshige, A., et al, "Electrical Property, Crystal Structure and Oxygen Nonstoichiometry of La1-xSrxCo0.2Fe0.8O3-d," Electrochemistry 68 (2000) 515.
Matsumoto, Y., et al, "Oxygen Evolution on La1-xSrxFe1-yCoyO3 Series Oxides," J. Electrochem. Soc. 127 (1980) 2360.
Mineshige, A., et al, "Introduction of A-site deficiency into La0.6Sr0.4Co0.2Fe0.8O3-δ and its effect on structure and conductivity," Solid State Ionics 176 (2005) 1145-1149.
Kostogloudis, G.Ch., et al, "Properties of A-site-deficient La0.6Sr0.4Co0.2Fe0.8O3-δ-based perovskite oxides," Solid State Ionics 126 (1999) 143-151.
Hansen, K.K., et al, "A-Site deficient (La0.6Sr0.4)1-sFe0.8Co0.2O3-δ perovskites as SOFC cathodes," Solid State Ionics 178 (2007) 1379-1384.
Waller, D., et al, "The effect of thermal treatment on the resistance of LSCF electrodes on gadolinia doped ceria electrolytes," Solid State Ionics 86-88 (1996) 767-772.

* cited by examiner

*Primary Examiner* — Steven Bos
(74) *Attorney, Agent, or Firm* — James M. Chan

(57) ABSTRACT

An improved LSCF 6428 perovskite material of the type $La_{1-2z}Sr_{x+z}Co_{0.2+a}Fe_{0.8+b}O_{3-\delta}$ wherein $x=0.4$, $z=(0-0.1)$, $a=(0.01-0.04)$, and $b=(0.05-0.15)$ for use as an SOFC cathode having increased electronic and ionic conductivity. The general formula is similar to the prior art formulae $(La_{0.6}Sr_{0.4})_{1-z}Co_{0.2}Fe_{0.8}O_{3-\delta}$ and $La_{0.6}Sr_{0.4}Co_{0.2}Fe_{0.8}O_{3-\delta}$ but applies the z term to La and Sr independently as well as reducing the overall content of La. Further, by adding a small amount (a) of extra Co ions, catalytic activity, conductivity, and sinterability are further enhanced. Adding small amounts (b) of Fe and/or Fe and Co moderates the thermal expansion coefficient with no adverse effect on crystal structure or fuel cell performance. Improved sinterability, microstructure, and reduced film cracking result in high power density of fuel cells. An inherently low-cost solid state reaction method is described.

5 Claims, 5 Drawing Sheets

| | COMPOSITION | SINTERING TEMP./TIME | MILLING MEDIA | SURFACE AREA M²/G | METHOD |
|---|---|---|---|---|---|
| 1. | $(La_{0.6}Sr_{0.4})_{0.95}Co_{0.2}Fe_{0.8}O_{3-\delta}$ | COMMERCIAL | --- | 9.3 | COMBUSTION SPRAY PROCESS |
| 2. | $La_{0.6}Sr_{0.4}Co_{0.2}Fe_{0.8}O_{3-\delta}$ | COMMERCIAL | --- | 5.7 | SOLID STATE REACTION |
| 3. | $La_{0.5}Sr_{0.45}Co_{0.2}Fe_{0.8}O_{3-\delta}$ | 1250°C/1H OR | S.S | 9.2 | SOLID STATE REACTION |
| 3a. | $La_{0.5}Sr_{0.45}Co_{0.2}Fe_{0.8}O_{3-\delta}$ | 1400°C/1H | | | |
| 4. | $La_{0.5}Sr_{0.45}Co_{0.2+0.025}Fe_{0.8}O_{3-\delta}$ | 1250°C/1H | S.S | 10.9 | SOLID STATE REACTION |
| 5. | $La_{0.5}Sr_{0.45}Co_{0.2+0.025}Fe_{0.8+0.12}O_{3-\delta}$ | 1250°C/1H | S.S | 8.7 | SOLID STATE REACTION |
| 5a. | $La_{0.5}Sr_{0.45}Co_{0.2+0.025}Fe_{0.8+0.12}O_{3-\delta}$ | 1250°C/1H | YSZ | 9.1 | |

FIG. 3.

PEROVSKITE MATERIALS FOR SOLID OXIDE FUEL CELL CATHODES

STATEMENT REGARDING FEDERALLY SPONSORED RESEARCH OR DEVELOPMENT

This invention was made with United States Government support under Government Contract/Purchase Order No. DE-FC26-02NT41246. The Government has certain rights in this invention.

TECHNICAL FIELD

The present invention relates to solid oxide fuel cells (SOFCs); more particularly, to materials for forming the cathode in an SOFC; and most particularly, to improved perovskite-type materials (known in the SOFC art as "LSCF" compositions) having enhanced ionic and electronic conductivity, improved thermal properties, and capability for yielding higher SOFC power densities.

BACKGROUND OF THE INVENTION

Solid oxide fuel cell (SOFC) technology is being developed for automotive and stationary applications. It is known that mixed ionic and electronic conducting (MIEC) perovskite-type $ABO_3$ oxides are promising cathode materials for solid oxide fuel cells and oxygen semi-permeable membranes.

The general chemical formula for perovskite compounds is $ABX_3$, wherein 'A' and 'B' are two cations of very different sizes, and X is an anion that bonds to both. (The native titanium mineral perovskite itself is of the formula $CaTiO_3$). The 'A' atoms are larger than the 'B' atoms. The ideal cubic-symmetry structure has the B cation in 6-fold coordination, surrounded by an octahedron of anions, and the A cation in 12-fold cuboctahedral coordination. The relative ion size requirements for stability of the cubic structure are quite stringent, so slight buckling and distortion can produce several lower-symmetry distorted versions, in which the coordination numbers of A cations, B cations, or both are reduced.

In the LSCF pervoskite crystal lattice, the A-sites are occupied by La and Sr ions, and the B-sites are occupied by Co and Fe ions that surround oxygen ions. In these materials, the cathode oxygen exchange reaction in an SOFC is not limited only to the triple-phase boundary line between electrolyte, cathode, and gas phase, but extends over a large three-dimensional area within the cathode.

Compositions of the general formula $La_{1-x}Sr_xCo_{1-y}Fe_yO_{3-\delta}$ have been proposed in the prior art as materials for SOFC cathodes due to their high catalytic activity for the oxygen exchange reaction and a high electronic conductivity for current collection. The physical and chemical properties of this class of materials, such as electrical conductivity, electronic structure, catalytic activity, stability, and thermal expansion coefficient (TEC), have been studied in detail. Generally, electronic and ionic conductivities and catalytic activity are enhanced with increasing values of x and decreasing values of y, whereas there is an opposite tendency for chemical stability.

Further, it is known that these properties are strongly affected by a change in the combination of La and Co oxide concentrations. Electronic conductivity for $La_{0.6}Sr_{0.4}Co_{0.2}Fe_{0.8}O_{3-\delta}$ (also known in the art as "LSCF 6428") is sufficient (>250 S/cm at 1073° K) for the above-mentioned applications. However, ionic conductivity is rather low (~$10^{-2}$ S/cm at 1273° K). It has been suggested that increasing Sr-deficiency in LSCF 6428 is a way to improve its oxide ionic conductivity and catalytic property for oxygen reduction.

Another investigation on A-site deficiency has reported significant decrease in electronic conductivity in the order $La_{0.6}Sr_{0.4-z}>(La_{0.6}Sr_{0.4})_{1-z}>La_{0.6-z}Sr_{0.4}$. In yet an another investigation, it has been concluded that the TEC decreases with decreasing A-site stoichiometry, and that electronic conductivity of the perovskites has a weak dependence on the A-site stoichiometry. As a result, $(La_{0.6}Sr_{0.4})_{1-z}Co_{0.2}Fe_{0.8}O_{3-\delta}$ materials are commonly used for SOFC cathodes and are available commercially.

From the above discussion it is clear that while A-site deficiency is desirable, both ionic and electronic conductivities need to be high to drive performance in terms of fuel cell power density ($W/cm^2$) and to reduce the cost. This is because cathode polarization, or resistance associated with the low rate of chemical and electrochemical reactions occurring in the cathode, is still the major source of voltage loss in SOFCs. Control of cathode microstructure (pore size, shape, and porosity) helps, but supply of electrons (electronic conductivity) and oxygen (oxide ion conductivity) deep into the cathode is the key to reducing cathode losses.

The supply of oxygen ions to the electrolyte is a function of ionic conductivity on one hand and the supply of electrons on the other hand and depends on the electronic resistivity of the cathode material. What is desired is a cathode material that has high electronic and ionic conductivities along with high catalytic activity. Further, cathode polarization resistance, mechanical properties, and cost are major concerns in the development of a practical SOFC.

Still further, reducing cost of manufacture requires a reduction in fuel cell operating temperature to around 750° C. or below so that less expensive interconnect and sealing materials can be used. The degradation of these materials is reduced at lower operating temperature, and thus reliability and long-term stability of a fuel cell stack is improved. Development of such materials can help in attaining higher power density ($W/cm^2$) at lower cost from SOFC stacks.

What is needed in the art is improved LSCF perovskite materials having enhanced ionic and electronic conductivity, improved thermal properties, and capability for yielding higher SOFC power densities and at lower operating temperatures.

It is a principal object of the present invention to reduce the cost of manufacture and improve performance and stability of a solid oxide fuel cell.

SUMMARY OF THE INVENTION

Briefly described, the present invention comprises an improved LSCF 6428 perovskite material for use as a cathode in an SOFC and a method for forming the material. By creating deficiency on the A-site of the pervoskite lattice by reducing La or Sr or La+Sr in the LSCF 6428 material, electrical conductivity is reduced. Sr deficiency in LSCF material increases conductivity of the oxide ion.

LSCF 6428 materials in accordance with the present invention of the type $La_{1-x-2z}Sr_{x+z}Co_{0.2+a}Fe_{0.8+b}O_{3-\delta}$ where preferably x=0.4, z=(0-0.1), a=(0.01-0.04), and b=(0.05-0.15) exhibit enhanced ionic and electronic conductivity. These materials are La-deficient but Sr-rich with respect to prior art LSCF 6428 materials. The general formula is similar to the prior art formulae $(La_{0.6}Sr_{0.4})_{1-z}Co_{0.2}Fe_{0.8}O_{3-\delta}$ and $La_{0.06}Sr_{0.4}Co_{0.2}Fe_{0.8}O_{3-\delta}$ but applies the z term to La and Sr independently as well as reducing the overall content of La and increasing slightly the amount of Fe. Further, by adding a small amount of extra Co ions beyond the above stoichiometry, catalytic activity, conductivity, and sinterability may further enhanced.

Still further, adding small amounts of Fe and/or Fe and Co moderates the thermal expansion coefficient with no adverse effect on crystal structure or fuel cell performance.

Finally, improved sinterability, microstructure, and reduced film cracking from these compositions result in high power density and stability of fuel cells having these compositions as cathodes. While these pervoskites can be synthesized by various methods, a currently-preferred inherently low-cost solid state reaction method is described.

BRIEF DESCRIPTION OF THE DRAWINGS

The present invention will now be described, by way of example, with reference to the accompanying drawings, in which:

FIG. 3 is a table showing comparative manufacturing conditions and resulting specific surface areas for two commercially-available LSCF compositions and three exemplary LSCF compositions in accordance with the present invention;

The exemplifications set out herein illustrates currently preferred embodiments of the present invention, and such exemplifications are not to be construed as limiting the scope of the invention in any manner.

DESCRIPTION OF THE PREFERRED EMBODIMENTS

Figure 1:
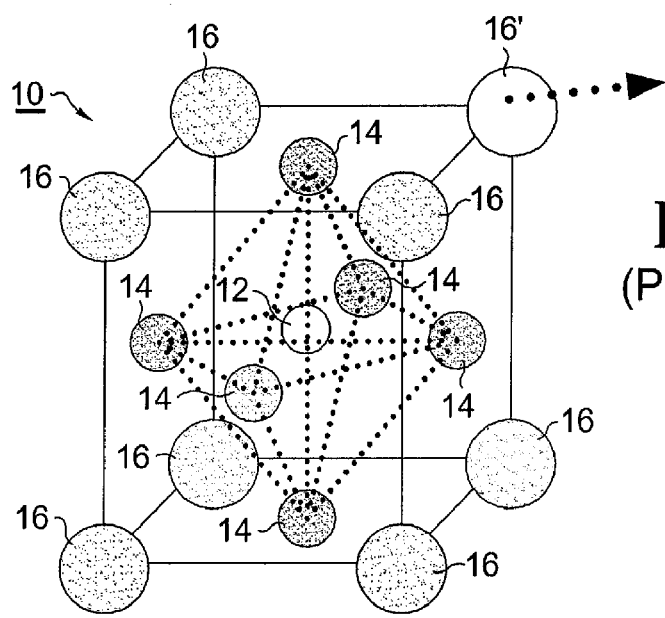
FIG. 1 is an isometric drawing of a prior art perovskite lattice structure used in the present invention.

Referring to FIG. 1, prior art perovskite lattice structure 10 comprises a central B-site cation 12 surrounded by a square double pyramid lattice of six oxygen ions 14 in turn surrounded by a cubic lattice of eight A-site cations 16. As noted above, the A-sites are occupied by La and Sr ions, and the B-sites are occupied by Co and Fe ions that surround oxygen ions 14.

Figure 2:
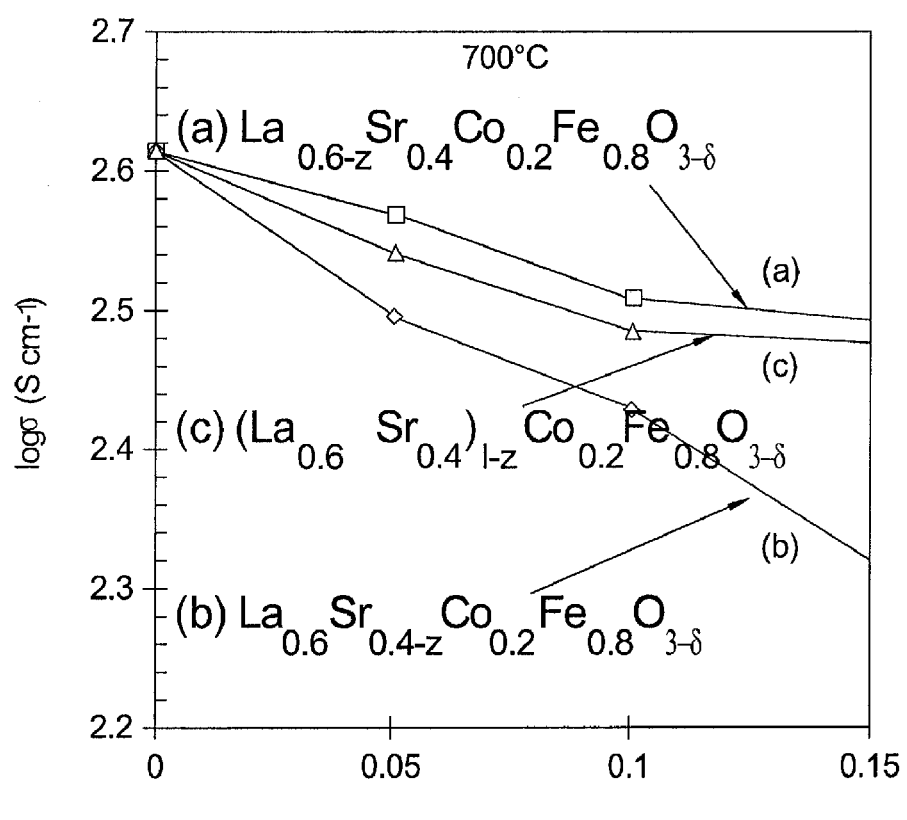
FIG. 2 is a prior art graph showing the adverse effect on electronic conductivity of reducing the molar amount of La, Sr, and La+Sr by various molar amounts z.

In the present invention as well as in the prior art, in forming a suitable LSCF 6428 material some of the cubic A-sites, such as site 16', which would otherwise contain La or Sr, are left vacant. As is known in the prior art, when Sr is omitted from some A-sites 16' ionic conductivity $\sigma_{ion}$ of LSCF is increased. However, such omission unfortunately causes a concomitant reduction in electronic conductivity $\sigma_e$. FIG. 2 is a prior art graph showing the effect on $\sigma_e$ of reducing the molar amount of La, Sr, and La+Sr by various molar amounts z.

Considering factors such as chemical stability, TEC, electrochemical activity, and ease of manufacturing A-site deficient LSCF perovskites, $La_{1-x-2z}Sr_{x+z}Co_{0.2+a}Fe_{0.8+b}O_{3-\delta}$, with z about 0.05, three such novel perovskites as shown in FIG. 3 were synthesized by solid-state reaction of cationic salts. Compositions 1 and 2 were two commercially-available LSCF 6428 compositions manufactured by a prior art combustion spray process and a solid state reaction process, respectively. Note that compositions 3,4,5 in accordance with the present invention are deficient in La and enriched in Sr with respect to prior art compositions 1,2.

For the three novel compositions 3,4,5 in accordance with the present invention, appropriate amounts of $La_2O_3$, $SrCO_3$, $CoCO_3$, and $Fe_2O_3$ salts were mixed and ball-milled for 12 hours using aqueous or isopropyl alcohol as a medium. The wet slurries were then heated to 105° C.-120° C. and dried. The resultant mixtures were each calcined at about 800° C. for 1 hour. Next, the resulting powders were ground by ball milling for several hours until a mean particle size ($d_{50}$) of about 1.0 μm was achieved. A small amount (composition 3a) of $La_{0.5}Sr_{0.45}Co_{0.2}Fe_{0.8}O_{3-\delta}{}^3$ was calcined at 1400° C. for 1 hour. All the powders were then calcined at 1250° C. for 1 hour (range 1100° C.-1400° C., 0.5-3 h) and were remilled for several hours until a mean particle size ($d_{50}$) of about 0.8 μm was achieved. Heating and cooling rates were controlled at 5° C./min. After calcination, all powders were wet milled using alcohol and stainless steel balls as the media. A small amount of one of the compositions (composition 5a) was also wet milled using ceramic balls formed of yttrium-stabilized zirconia (YSZ) as the media. Although solid-state reaction was used to prepare these pervoskites, alternative known methods such as EDTA or citrate pyrolysis, flame or combustion spray, sol-gel, dissolution of metal nitrates, glycine nitrate, and the like, may be employed as well.

X-ray diffraction patterns were taken of all the FIG. 3 LSCF powders, represented by $La_{1-x-2z}Sr_{x+z}Co_{0.2+a}Fe_{0.8+b}O_{3-\delta}$ and synthesized by solid-state reaction method, using a Siemens D500 equipped with a monochromated Cu Kα radiation source. A comparison with $(La_{0.6}Sr_{0.4})_{0.95}Co_{0.2}Fe_{0.8}O_{3-\delta}$ prepared by combustion spray process (commercial composition 1) revealed that all the X-ray diffraction patterns of LSCF-powders were single perovskite type structures and were indistinguishable from each other. With about 5% A-site deficiency and additional Co and Fe in two of the compositions (compositions 4,5) traces of $(Co,Fe)_3O_4$ were possible (while not observed) and were not considered to be detrimental for use as an SOFC cathode.

Figure 4:
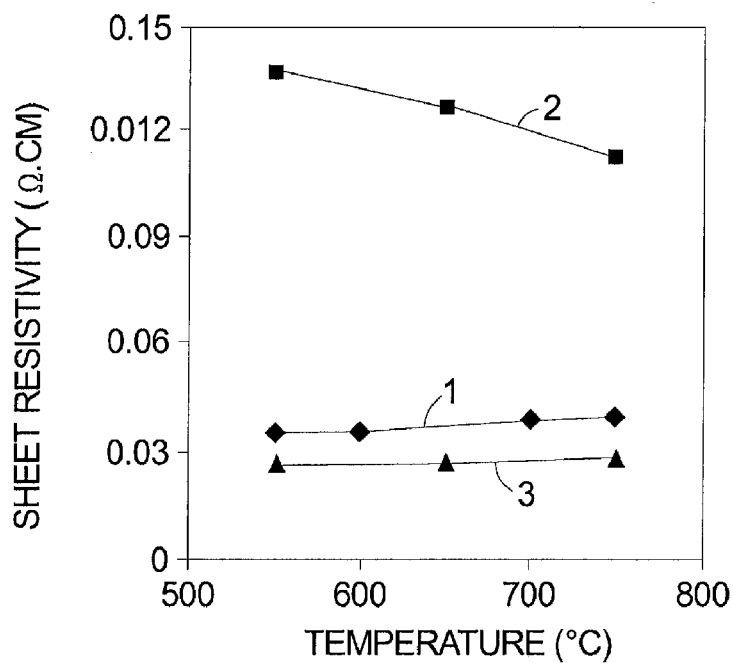
FIG. 4 is a graph of sheet resistivity as a function of temperature, showing reduced resistivity and hence improved conductivity of LSCF compositions in accordance with the present invention.

Sheet resistivity of $La_{0.5}Sr_{0.45}Co_{0.2}Fe_{0.8}O_{3-\delta}$ (composition 3) was compared with commercial materials 1,2. For this purpose, three strip cells with respective cathode materials (2.5 $cm^2$ area) on anode-supported electrolytes were prepared. The cathodes included a 5 μm thick samarium doped ceria (SDC) layer and a 30 μm thick LSCF layer. The SDC layer was sintered at 1200° C. with particle size about 0.3 μm while the LSCF layer was sintered at 1050° C. with particle size about 1.0 μm. Two Ag/Pd strips (containing 15 wt. % Pd) were coated on each cathode 0.45 cm apart. A platinum wire, spot welded to a silver screen, was used as a current lead. Two such screens were then pasted on the Ag/Pd strips with an Ag/Pd thick film ink. The strip cell was placed inside a furnace and tested in air using an AC impedance technique. During the measurement, the temperature of the strip cell was set between 550 and 750° C. In this measurement, electrons were laterally transferred from one Ag/Pd strip into a sheet of the cathode material and then transferred out through the other Ag/Pd strip. After subtracting the resistance of the Pt leads, the sheet resistivities for the LSCF cathode materials were calculated as shown in FIG. 4. In this calculation, the contact resistance existing between the silver screen and the Ag/Pd strip was not excluded.

Figure 5:
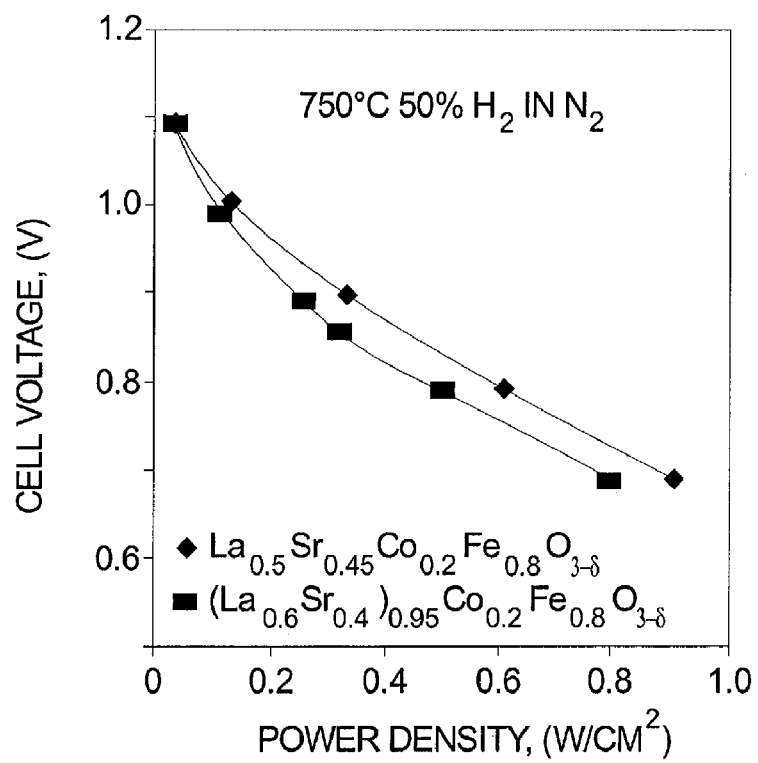
FIG. 5 is a graph of polarization curves showing a comparison of cell voltage and power density for a prior art LSCF composition and an LSCF composition in accordance with the present invention.

FIG. 4 shows that as compared to combustion sprayed commercial composition 1, and solid state reaction commercial composition 2, material in accordance with the present invention and represented by composition 3 had the lowest sheet resistance (highest sheet conductivity). Further, and referring now to FIG. 5, a higher power density was measured at a variety of cell voltages for improved LSCF composition 3 in comparison to prior art LSCF composition 1.

To determine the effect of LSCF compositions on the cathode resistance, button cells with symmetrical cathodes were prepared on YSZ electrolyte (0.42 mm thick, as support) for each of the five LSCF materials shown in FIG. 3. Each cell had two symmetrical cathodes (2.5 cm$^2$). The construction of button cells was similar to that of strip cells described above except that there were cathodes on both sides of the electrolyte. The resistance of the cathodes was measured using an AC impedance technique. During the measurement, a sinusoidal voltage (20 mV peak) was applied to the electrodes. The frequency of the sinusoidal voltage was scanned from 1 to 10 kHz. The sinusoidal current response of the system was then measured. From the voltage/current ratio, an AC impedance spectrum was obtained. In the spectrum, the width of the opening corresponded to the resistance of the cathode. The AC impedance spectra obtained at 650° C. are shown in FIG. 6.

Figure 6:
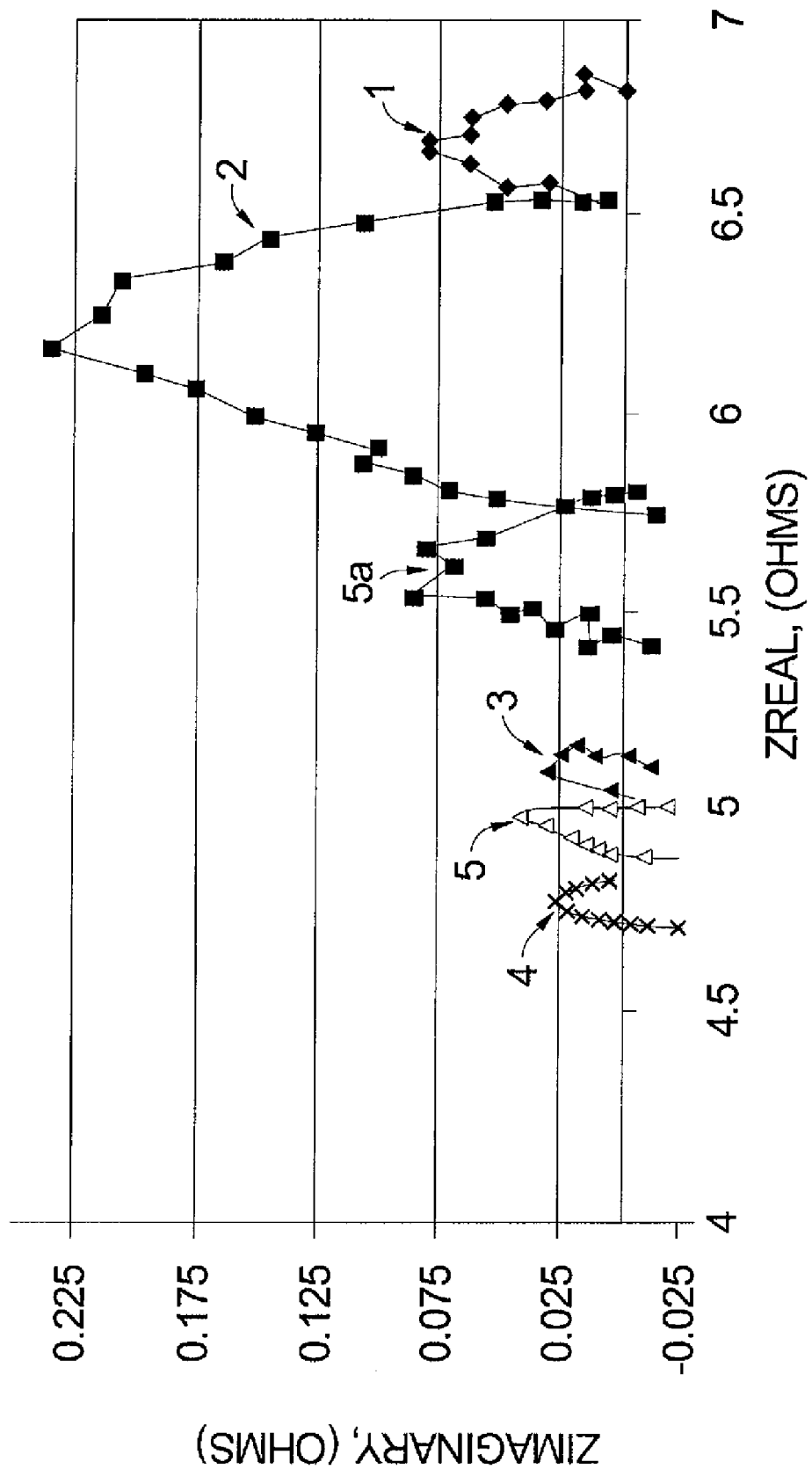
FIG. 6 is a graph of AC impedance spectra for the five LSCF compositions shown in FIG. 3, obtained at 650° C.

FIG. 6 shows that $La_{1-x-2z}Sr_{x+z}Co_{0.2+a}Fe_{0.8+b}O_{3-\delta}$ materials 3,4,5 obtained via solid state reaction have spectra with smaller opening than commercial material 2. This implies a higher rate of oxygen ion conversion, as the width of the opening is inversely proportional to the rate of the cathodic reactions. Further, material 4 with slight excess of cobalt possesses high electronic and ionic conductivities along with high catalytic activity. Still further, milling of $La_{0.5}Sr_{0.45}Co_{0.2+0.025}Fe_{0.8+0.12}O_{3-\delta}$ $^5$ material with metallic beads (composition 5) or ceramic beads (composition 5a) shows that ceramic beads (YSZ, alumina, $ZrO_2$) degrade the material. Finally, materials formed in accordance with the present invention yield films that have few cracks and high mechanical strength after sintering.

Based on results shown in FIG. 6, three 1-inch diameter cells were prepared to evaluate power density performance with time. These cells were built on a 12 micron thick YSZ electrolyte supported on a 0.45 mm Ni/YSZ substrate acting as an anode. All the layers were screen printed using a paste obtained by mixing about 60 wt % of a solid phase with an organic binder. First, the electrolyte surfaces of these cells were covered with a $Sm_{0.2}Ce_{0.8}O_2$ with 2 wt % $Fe_2O_3$. The thickness of the layer was 4-5 μm after sintering at 1200° C. Next, the LSCF cathodes were screen printed to produce cathodes with active area of 2.5 cm$^2$. After sintering at 1050° C., the thickness of the cathodes were about 30 μm. Silver and nickel meshes with platinum lead wires and pastes were used to establish the current collectors. The air and fuel sides of the cells were isolated using a glass sealing material. The NiO/YSZ composite anode was reduced, in situ, at 800° C. for 1 hour in a hydrogen gas atmosphere (50% $H_2$ in $N_2$). During testing, the cathode side of the cell was exposed to flowing air at a rate of 2.3 L/min and the anode side was exposed to a flowing stream of 50% hydrogen at a rate of 2.3 L/min. The electrochemical measurements were conducted at 750° C. using a potentiostat/galvanostat (PARSTAT® 2273) and power-generating characteristics as a function of time were measured at a polarization potential of 0.7V.

Figure 7:
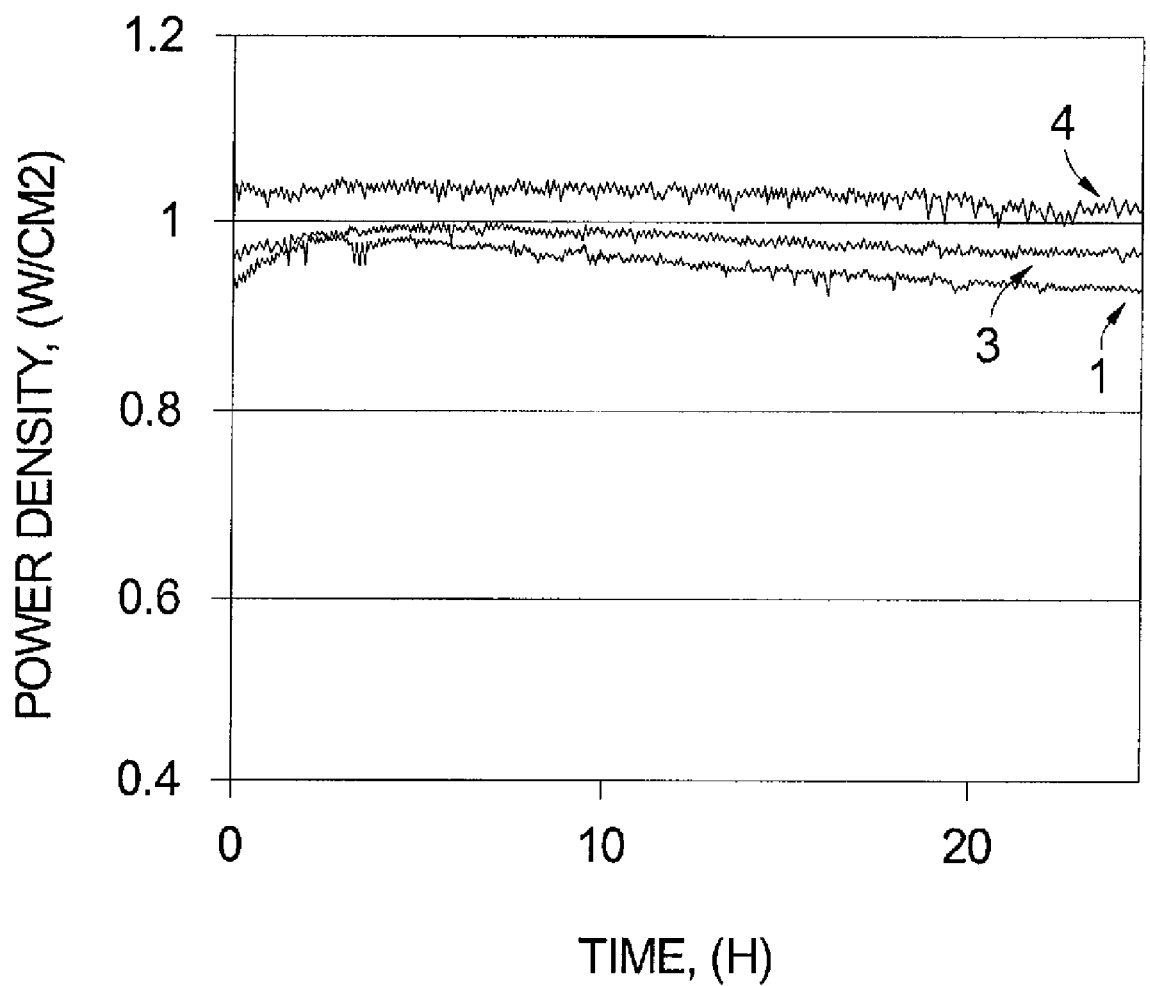
FIG. 7 is a graph of power density as a function of time for SOFCs having cathodes formed of LSCF compositions 1, 3, and 4.

FIG. 7 shows power generation characteristics of compositions 3,4 in accordance with the present invention, and prior art composition 1. Under these conditions, at 750° C. the $La_{1-x-2z}Sr_{x+z}Co_{0.2+a}Fe_{0.8+b}O_{3-\delta}$ materials produce stable and high power, implying high catalytic activity with improved ionic and electronic conductivities. Further, the solid state reaction manufacturing method described above is suitable for low-cost volume production of such LSCF materials.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for making an LSCF composition of the general type $La_{1-x-2z}Sr_{x+z}Co_{0.2+a}Fe_{0.8+b}O_{3-\delta}$ comprising the steps of:
    a) combining amounts of $La_2O_3$, $SrCO_3$, $CoCO_3$, and $Fe_2O_3$ to form a mixture thereof, said amounts being appropriate to forming said LSCF composition having predetermined values of x, z, a, and b;
    b) first ball milling said mixture for about twelve hours in a first wet medium selected from the group consisting of water, an alcohol, and combinations thereof, to form a slurry;
    c) drying said slurry at a temperature between about 105° C. and about 120° C. to form a dried mixture;
    d) first calcining said dried mixture at about 800° C. for about one hour;
    e) second ball milling said dried mixture of step d to form a first dry powder having a mean particle size of about 1.0 μm;
    f) second calcining said first dry powder for between about one half hour and about three hours at a temperature between about 1100° C. and about 1400° C.;
    g) third ball milling said first dry powder of step f in a second wet medium to form said LSCF composition; and
    h) drying said LSCF composition of step g.

2. A method in accordance with claim 1 wherein said second calcining step is carried out for about one hour at a temperature of about 1250° C.

3. A method in accordance with claim 1 wherein said second wet medium includes an alcohol.

4. A method in accordance with claim 1 wherein said third ball milling step is carried out using stainless steel balls.

5. A method in accordance with claim 1 wherein said LSCF composition resulting from said third ball milling step has a mean particle size of about 0.8 μm.

* * * * *